United States Patent
Holtzberg

Patent Number: 5,849,229
Date of Patent: Dec. 15, 1998

[54] METHOD FOR MOLDING COMPOSITE, STRUCTURAL PLASTICS, AND OBJECTS MOLDED THEREBY

[76] Inventor: Matthew Holtzberg, 55 Copper Hill Park, Ringwood, N.J. 07456

[21] Appl. No.: 714,813

[22] Filed: Sep. 17, 1996

[51] Int. Cl.$^6$ .................................................. B29C 39/02
[52] U.S. Cl. .................. 264/102; 264/40.6; 264/313; 264/317
[58] Field of Search .................... 264/102, 313, 264/317, 257, 258, 40.6

[56] References Cited

U.S. PATENT DOCUMENTS

| | | | |
|---|---|---|---|
| 3,692,892 | 9/1972 | Lemelson | 264/317 |
| 3,975,479 | 8/1976 | McClean | 264/102 |
| 4,355,128 | 10/1982 | Mercer . | |
| 5,045,251 | 9/1991 | Johnson | 264/317 |
| 5,176,864 | 1/1993 | Bates et al. | 264/317 |
| 5,280,053 | 1/1994 | Dearlove et al. . | |

*Primary Examiner*—Mathieu D. Vargot
*Attorney, Agent, or Firm*—W. Patrick Quast, Esq.

[57] ABSTRACT

A method for producing composite, structural plastic parts in traditional foundry molds, including sand, permanent, die-cast, wax and investment molds. Short fiber length fibers reinforcing low viscosity thermoset resins, and in particular resole phenolics, provides a pourable low bulk density polymer compound with minimal externally applied thermal requirements during molding and post cure when required. Foundries can consider metal parts replacement with this new method. It permits foundries to actually produce composite, structural plastic parts with superior mechanical and thermal properties. This permits them to provide plastic products on a competitive basis with the compression and injection molders.

11 Claims, 5 Drawing Sheets

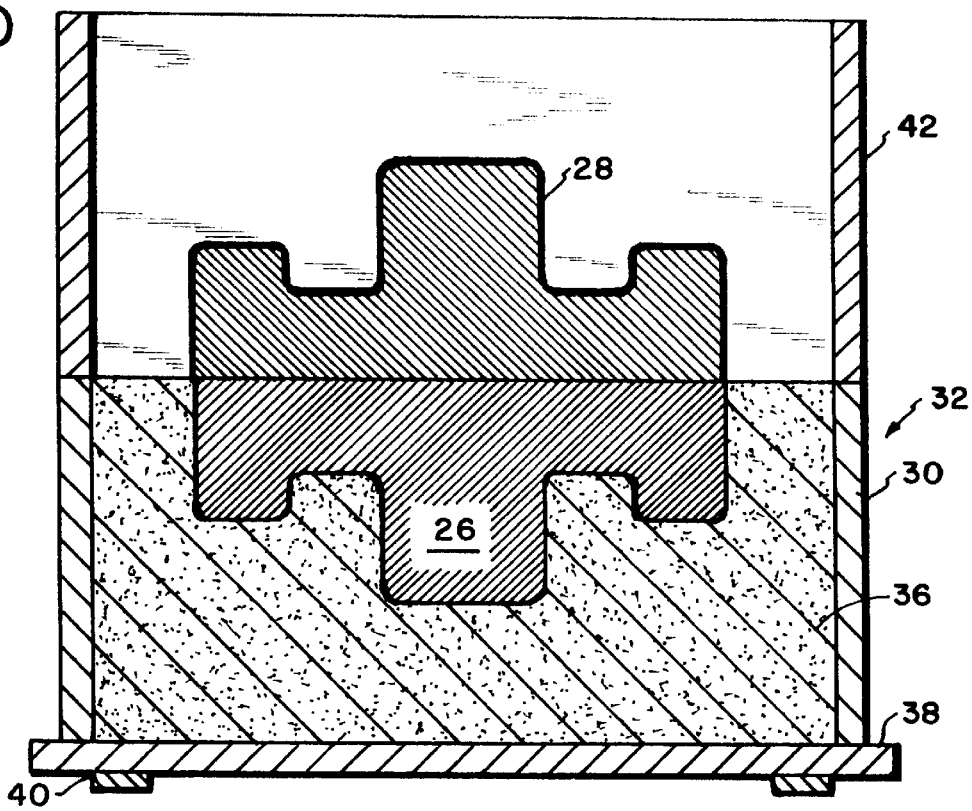
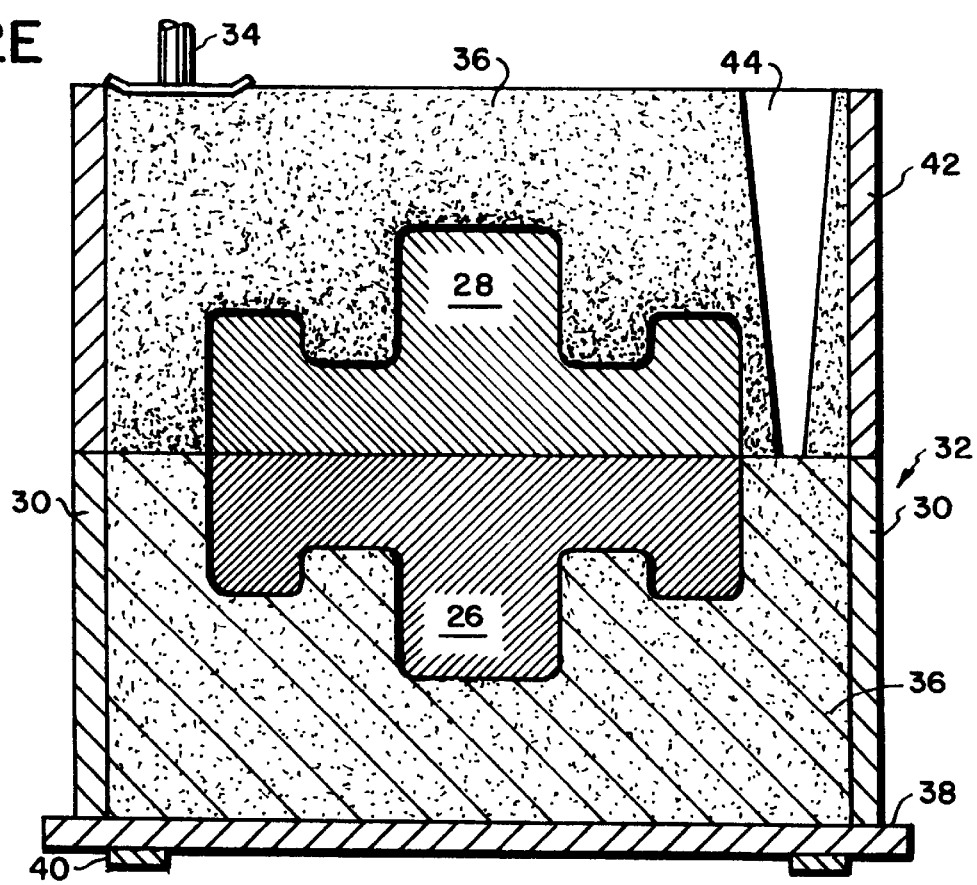

METHOD FOR MOLDING COMPOSITE, STRUCTURAL PLASTICS, AND OBJECTS MOLDED THEREBY

BACKGROUND

This invention relates to the molding of objects in a plastic material, and in particular to molding composite, structural plastic objects in molds traditionally used for molten metal casting.

Typically a foundry is a facility for processing metals into usable shapes by first melting the metal and then pouring the molten metal into a mold. In this manner structural items are fabricated in steel, iron, copper, aluminum, and so on, for a virtually limitless variety of applications. The traditional molds for casting metals are sand, permanent, die, and investment casting. In sand casting, the molds and cores are produced out of sand, and are held together with a binder. The molds use either a matrix of clay, sand, and water, while cores are held together with a resinous material, such as phenolics, urethanes, furan, and variations of these. In some cases molds are held together with a resinous binder, such as phenolic, but the clay/water matrix known as "green sand" represents 80% of foundry casting procedures.

In permanent mold casting, a permanent material is used in place of the sand, typically metal or plaster. The molten metal cools more rapidly with a metal mold and produces a better grain structure in the cast part. A permanent mold, unlike the sand mold which is replaced with each casting, can be reused. In die casting, a permanent mold, typically metal, is used. Vacuum and/or pressure are typically employed to draw or force molten metal into the mold producing shorter cycle times as compared to the gravity feed with sand. Unlike the other methods described above, the mold is clamped under pressure to resist the pressure of the metal entering the mold. In investment casting a wax duplicate of the intended shape is molded. A mold is made by dipping the wax pattern into a ceramic bath. The ceramic mold is cured with heat which burns off the wax "investment". Molten metal is then poured into the ceramic mold producing very complex shapes. Once the metal has cooled the ceramic mold is broken, leaving a finished part.

Of course, if a successful method could be found which would permit the use of metal casting molds to fabricate composite, structural plastic products, perhaps the anticipated demise of foundries can be avoided. This gloomy future is the inevitable result of the trend to replace metal by plastic with its inherent advantages including lighter product weight, corrosion resistance, noise abatement, and lower material and processing costs. For example, because you can mold to a net or near net shape, approximately 60% of the secondary machining operations required with metal castings can be eliminated utilizing plastic fabrication.

With the development of fiber reinforced plastics, composite, structural plastics became a reality. Mixing quantities of fiberglass, graphite, KEVLAR®, and ceramics together with certain liquid resins prior to curing the plastic can produce molded parts with equivalent or superior structural qualities to metal parts. For example, in U.S. Pat. No. 4,848,292, issued Jul. 18, 1989, a cylinder head and engine block assembly formed from a fiber-reinforced phenolic resin, for use in an internal combustion is described. The method employed in this invention, however, utilized either compression or injection molding. In both of these processes dry resin powder and a reinforcing fiber are pre-mixed and formed into a shape that can be molded. In the molding process external heat applied to the resin and mold is necessary to melt the resin, and, in concert with the pressure, force the material into the mold. Heat required for these molding procedures range from 250°–650° F., while pressure required ranges between 150–5,000 PSI. Heat, as provided by external means, is the primary method used for completing the chemical transition to a fully crosslinked and cured polymer.

Obviously if the high quality composite, structural plastics obtainable with injection and compression molding can be accomplished without pressure or high added heat, and without a post molding cure cycle, low cost molding procedures traditionally used in foundries can be employed without the costly heat treating equipment which is otherwise standard. In the instant invention low viscosity thermoset resin mixes including reinforcing fibers and catalysts are simply poured in traditional metal casting molds including sand, permanent, die-cast, wax and investment molds. This economical molding technique now permits producing high quality composite, structural molded plastics utilizing low cost molds heretofore used only in the production of metal parts.

It is therefore a primary object of the invention to permit molding composite, structural plastics in sand, permanent, die-cast, wax and investment molds.

Another object of the invention is to permit the molding of composite plastic equivalents to metal objects utilizing traditional foundry molds, and without the need for high temperature equipment for post cure cycles.

Still another object of the invention is to permit the molding of low cost and light weight composite plastic equivalents to foundry produced metal objects.

A further object of the invention is to reduce the machining of objects after casting in a foundry.

An additional object of the invention is to provide a method for molding high quality composite, structural objects utilizing relatively inexpensive molds typically used to produce cast metal parts.

A further object of the invention is to permit the simultaneous molding of intricate components of composite, structural plastic objects during a single molding operation.

SUMMARY

These and other objects are accomplished utilizing the method for molding structural composite plastics of the instant invention.

Today many businesses are converting their metal products to composite, structural plastics. Molding to net shape, weight reduction, corrosion resistance, and reduced energy costs are the main reasons for this material conversion. For automotive parts for example, weight reduction is crucial to improving future vehicle fuel consumption and meeting strict federal mandates. For marine applications, converting to plastics eliminates the corrosion problem in salt water, and also eliminates the need for environmentally un-friendly paint and coating processes to eliminate corrosion. And, in the aerospace and aircraft industries weight is the primary advantage in switching to lighter weight materials. Unless today's metal casting foundries can somehow adapt to compete in this plastic environment, it would appear they are doomed.

Heretofore molders of structural, composite plastics have relied on two primary fabrication processes, injection and compression molding, to provide fiber reinforced plastic equivalents of metal objects. In both of these processes, dry resin powder and a reinforcing fiber are pre-heated and formed into a shape that can be molded. In the molding process, external heat is necessary to melt the resin, and, in concert with the pressure, forces the material into the mold. Typical temperatures required are 250°–650° F., and typical pressures are 150–5,000 PSI. While the material is in the mold, heat externally provided is required to complete the transition to a fully crosslinked and cured polymer.

Recently, a technique making use of thermoset liquid resins called "Resin Transfer Molding" has been developed. In this process, a prefabricated shape comprised of long fibers, 1 inch minimum to continuous in length, is first formed closely resembling the finished part. This is then placed in a mold which is then closed. Liquid resin, without any filler, and catalyst are then added separately into the mold employing pressure and vacuum. This insures that the preformed fibrous structure is thoroughly infused with the resin and catalyst.

In the instant invention low viscosity thermoset resins, together with short fiber reinforcements, permit producing the same high quality composite, structural plastic in the simple, traditional foundry sand, permanent, die-cast, wax and investment molds in place of the substantially more expensive and complicated compression or injection molds. The method of the invention permits "no pressure" molding, with the object to be fabricated being fully cured by the action of a catalyst at relatively low exothermic resin temperatures. The thermoset resins that can be used include unsaturated polyester, phenolics, epoxy, urethanes, and vinyl ester resins. They are low enough in viscosity (100–3,000 CPS) to allow mixing with high percentages of fiber reinforcement. Typical fiber reinforcements include fiberglass, graphite, KEVLAR®, and ceramics. Typical fiber length is shorter than used in Resin Transfer Molding, e.g. milled, flake, $\frac{1}{16}$", $\frac{1}{8}$", and $\frac{1}{4}$" in length. Fiber loadings of the liquid thermoset resins are typically 10–65% volume by weight. This combination of short fibers plus low viscosity thermoset resins makes possible low bulk density compounds that can simply be poured rather than be pushed under pressure to fill a mold.

A preferred low viscosity thermoset resin for use in the instant invention is phenolic. Phenolic resins are often preferred over other thermosets for a number of reasons. Their high mechanical and thermal stability are equal or superior to aluminum at operating temperatures. Creep resistance is significantly superior to other resins. Cost considerations often favor phenolics. Good chemical resistance and ability to withstand extreme atmospheric conditions further enhance their attractiveness for a wide variety of applications.

There are two categories of phenolics: (1) Novalacs; (2) Resoles. Novalacs are thermoplastic materials that are made by heating phenol and formaldehyde in the presence of an acid catalyst, usually sulfuric or oxalic acid. The formaldehyde/phenol mole ratio must be less than one otherwise gelation will occur during manufacture. Novalacs are considered two stage resins since they need to be heated with the addition of formaldehyde in order to crosslink. Hexamine is the usual curing agent as it gives off the needed formaldehyde required to cause the gelation and crosslinking when heated.

The second category of phenolics are resoles and form the basis of the preferred phenolic resin of the instant invention. Resoles are considered to be one stage resins. They are also manufactured by heating phenol and formaldehyde using an alkaline catalyst. The formaldehyde/phenol mole ratio must be greater than one. Because of the high formaldehyde ratio resoles may crosslink with only heat and no addition of formaldehyde such as is required by novalacs, where formaldehyde ratios are raised with hexamines. Alternatively, resoles may be completely cured without additional heat through the addition of strong acids, such as phosphoric and toluenesulfonic acids. Resoles may use either water or ethylene glycol as a solvent. Typical catalyst ratios are 2–20% by weight. Since phenolics are crosslinked through a condensation reaction, water is a by-product. The use of ethylene glycol as a solvent is preferred to minimize the amount of water in the cure process. Many offer the catalyst with water as the solvent. Typical glycol percentages by weight are 50% for the resin and 17% for the catalyst.

The steps involved in utilizing the method of the invention are basically simple. A liquid thermoset resin, catalyst and quantity of fiber material are first mixed in whatever order the operator prefers. The fiber-resin-catalyst mix is then de-aerated, and at an appropriate time the mixture is poured into a standard foundry mold, for example, a sand, permanent, die-cast, wax or investment mold. Curing of the liquid plastic is accomplished entirely by means of the action of the catalyst and the exothermic heat generated by the reaction between the resin and the catalyst. When the molded object is cured it is simply removed from the mold and the process may then be repeated as required.

The advantages that are obtained utilizing the method of the invention are as follows:

(1) Composite plastics can be cast around the same types of molds and cores used in metal casting. Traditional injection and compression molding compounds cannot be used with the same type of metal casting molds because they require pressure to fill the mold and heat to cure the compound.

(2) The gelation time of the method of the invention can be equal or faster than most metals.

(3) Metal casting molds are 50–300% less expensive than the "hard" steel tooling required by injection and compression molds.

(4) Post cure (if required) for a cast polymer object is 1–2 hours at 100°–250° F. in contrast to a 4–5 hour 500° C. heat treatment for aluminum.

(5) The technique permits inserts to be placed in the casting molds that cannot be done with molds used for metal casting and present plastic molding techniques.

(6) Mold life is prolonged 300–500% over injection and compression molds due to the lack of pressure and high heat during processing.

(7) Secondary machining associated with injection or compression molding of plastic parts is reduced by approximately 40% with the "no pressure" molding method of the invention.

Thus it can be seen that the composite, structural plastic molding method of the invention offers important new conveniences and efficiencies for foundries desiring to produce composite plastic equivalents to metal objects. Foundries can now simply utilize existing sand, permanent, die-cast, wax and investment molds and existing patterns for these molds in order to produce these high quality composite plastics. And important new economies are realized for new projects, since heretofore essential compression and injection mold tooling can be eliminated in favor of far less expensive to fabricate metal casting molds.

BRIEF DESCRIPTION OF THE DRAWINGS

FIGS. 2A–2H illustrate a typical procedure for making and using a two part sand mold to produce composite, structural plastic objects according to the method of the invention.

DETAILED DESCRIPTION

Figure 1:
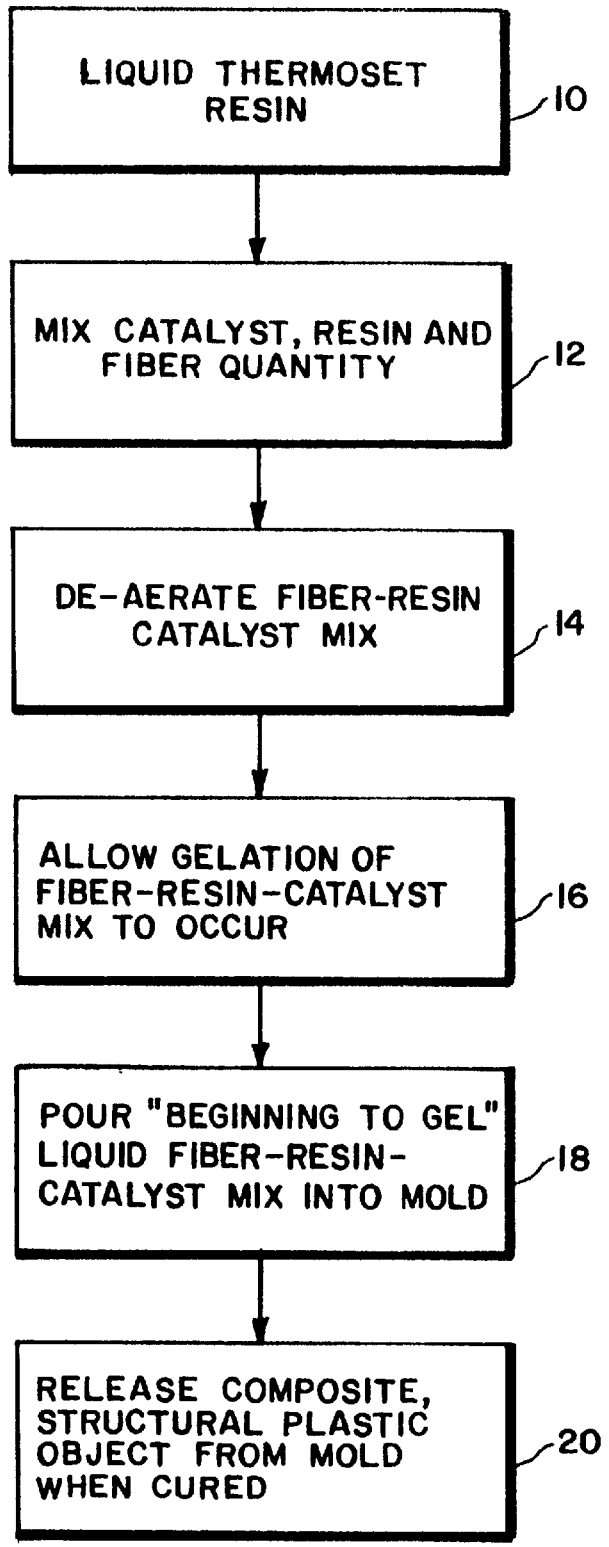
FIG. 1 is a flow chart outlining the steps involved in one version of the composite, structural plastic molding method of the invention.

Referring now to the drawings, in FIG. 1 a flowchart is given illustrating a typical procedure for molding composite, structural plastics according to the invention. A liquid thermoset resin 10 is selected for the particular application. This liquid material can be a resole phenolic, unsaturated polyester, urethanes, epoxy, or vinyl ester resin, with the resole phenolic being preferred for the reasons given above. The resin can be handled in virtually any manner for convenient dispensing as is well known to the art.

As a suitable catalyst, resole phenolics generally require strong acids, such as phosphoric acid and toluenesulfonic acid to effect a complete cure. Resole phenolics usually require either water or ethylene glycol as the solvent. Typical catalyst ratios are 2–20% by weight.

The low viscosities of the resin allows mixtures with higher percentages of fiber reinforcement. Typical fiber loadings are 10–65% volume by weight. Reinforcement fibers can be fiberglass, graphite, KEVLAR®, or ceramics. Fiber lengths employed are relatively short compared with the resin transfer method above, being either milled, flake, $\frac{1}{16}$", $\frac{1}{8}$", or $\frac{1}{4}$" in length. Typical fiber widths range between 10–40 microns, with 10 microns being a preferred width. It is essential to the method of the invention that relatively short fiber lengths described above be employed so as to combine with the low viscosity resin to produce low bulk density compounds that can be poured rather than pushed under pressure. However, woven, chopped, unidirectional, random and non-woven fibers may be added in selective parts of the mold to add additional structural integrity.

The second step involves the mixing of the liquid resin, catalyst and quantity of reinforcing fibers. This can occur in any sequence: mix fiber and resin and then add catalyst; mix catalyst and fiber and add mixture to resin; or mixed catalyst and resin and then add fibers. There is no preferred way. A suitable mixed, such as a paddle type mixer, is employed to effect a thorough mixing of the ingredients.

The third step 14 of the method of FIG. 1 involves the step of de-aerating the fiber-resin-catalyst mix prior to pouring the mixture. Agitating the mixture in any convenient manner, such as rolling the mixture container or continuing to stir the mixture, or by vibrating the mixture, or all means of agitation can be combined. The container for the mixture can also be subjected to a vacuum at this time to assist in de-aerating the compound and the removal of any water from the compound given off during the cure cycle, which is critical to producing usable parts.

Step four, 16 of FIG. 1, involves judging the appropriate time to begin the pouring of the fiber-resin-catalyst mix into the mold depending upon the percentage of catalyst used. The mixture should not be poured into the mold cavity until its viscosity reaches the point at which it is just about to thicken through the crosslink process. Typical temperatures at this time, resulting from the exothermic reaction, are in the range of 100° F. to 130° F. Typical gelation cycle times may be from 15 seconds to 8 hours although the compound may not enter the mold until the last seconds of the reaction. For certain applications it may be desirable to heat the mixture and/or mold to a maximum temperature of +120° F. This is done to minimize the loss of heat created by the exothermic reaction.

In step five, 18 of FIG. 1, the fiber-resin-catalyst mixture that is just beginning to gel is poured into a suitable foundry mold, such as a sand, permanent, die-cast, wax or investment mold. Dispensing equipment, including automatic measuring and dispensing equipment that is well known to the art may be used to fill the mold(s). As noted above, the mold may be pre-heated to +120° F. in order to expedite curing. The mold may also be subjected to a vacuum to facilitate the complete filling of the mold during the pour of the mixture into the mold.

As depicted in step six, 20 of FIG. 1, the mold is disassembled, and the finished molded object is removed from the mold. If required, the finished object may be subjected to a post cure in an oven heated to up to +250° F. for one to two hours to insure complete curing and moisture removal.

Figure 2A:
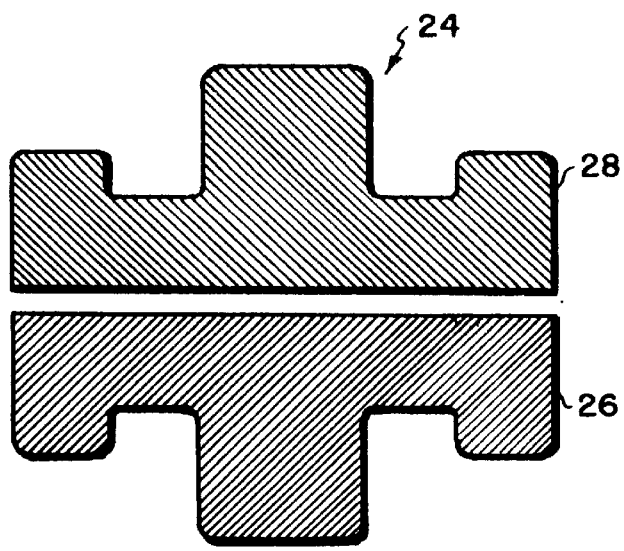
Figure 2B:
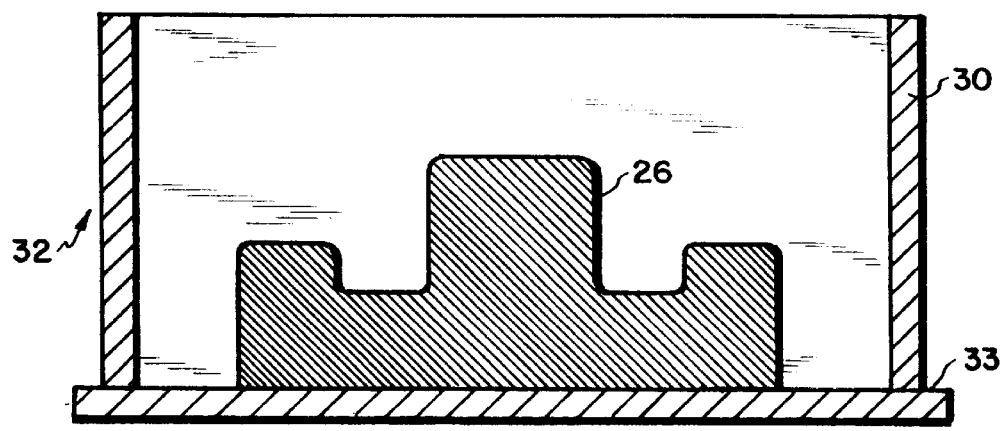
Figure 2C:
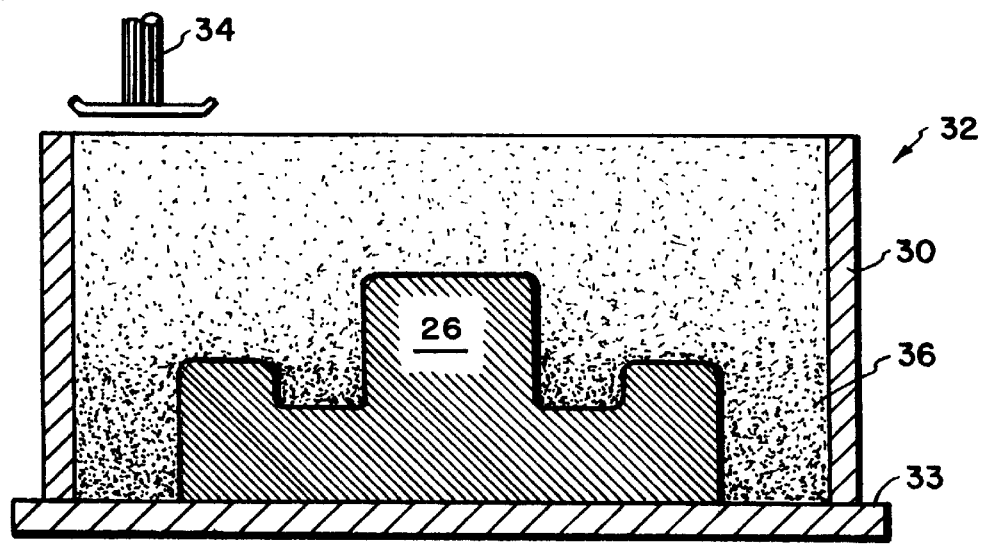
Figure 2F:
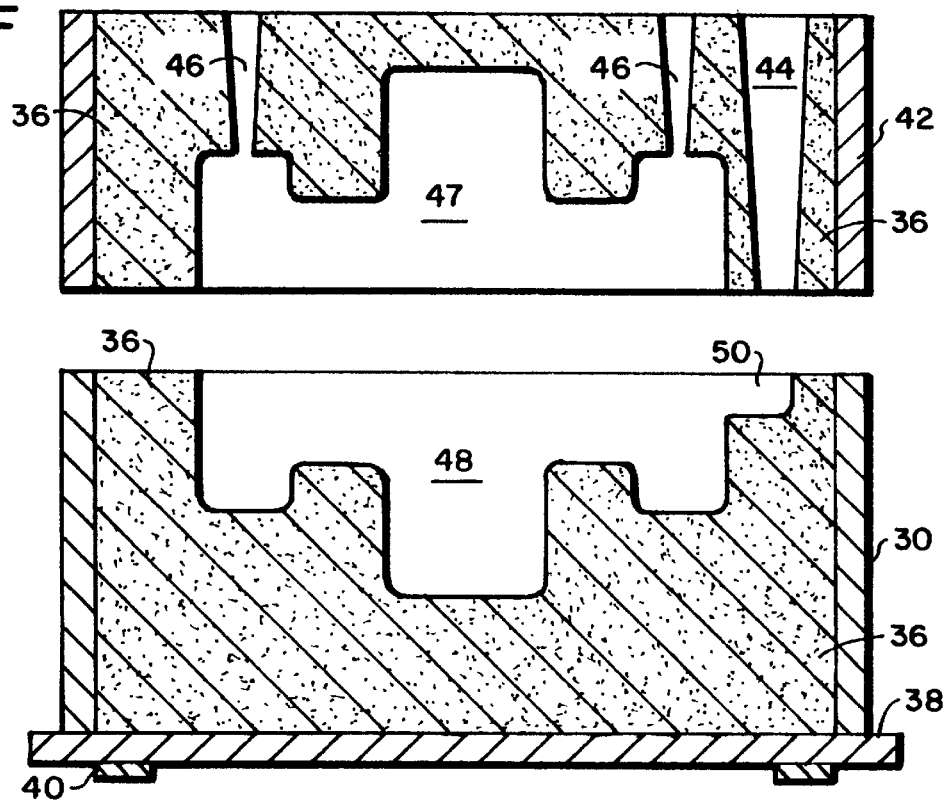

FIGS. 2A–2H illustrate making and using a typical sand mold in conjunction with the method of the invention. FIG. 2A shows a two piece pattern 24 (in wood or metal) representing the object to be molded. In FIG. 2B the base portion 26 of the pattern is shown in place in a bottom portion of a mold box 32, the box to be formed with four sides, each side having a bottom portion 30 and a top portion 42 (see FIG. 2D). FIG. 2C shows a sand-binder mixture 36 filling the bottom portion of the box making use of a ram 34 to compact the sand around the base pattern 26. FIG. 2D shows the removable mold box base 33 of FIG. 2C as having been removed, the half mold box sides 30 and base pattern 26 being turned 180° and placed on a permanent mold box base 38 with supporting feet 40, and with the top side portions 42 in place on top of the bottom side portions 30, and finally with the top pattern half 28 now positioned in place on the base pattern half 26. In FIG. 2E sand 36 is shown filling the top half of the mold box, with a funnel shaped opening 44 having been cut in the sand running the depth of the top half of the mold box. In FIG. 2F the top sides 42 of the mold box are shown raised from the bottom sides 30 so as to permit the removal of both halves of the pattern from the mold. This sand filled top half of the mold box is now shown having two vent holes 46 having been cut in the sand down to the top half of the now empty top mold configuration 47, and with the bottom half of the sand filled mold box with the now empty base mold configuration 48 having a lateral cut out 50 in the sand so as to form a channel with the funnel shaped opening 44 in the top half of the mold box when joined.

Figure 2G:
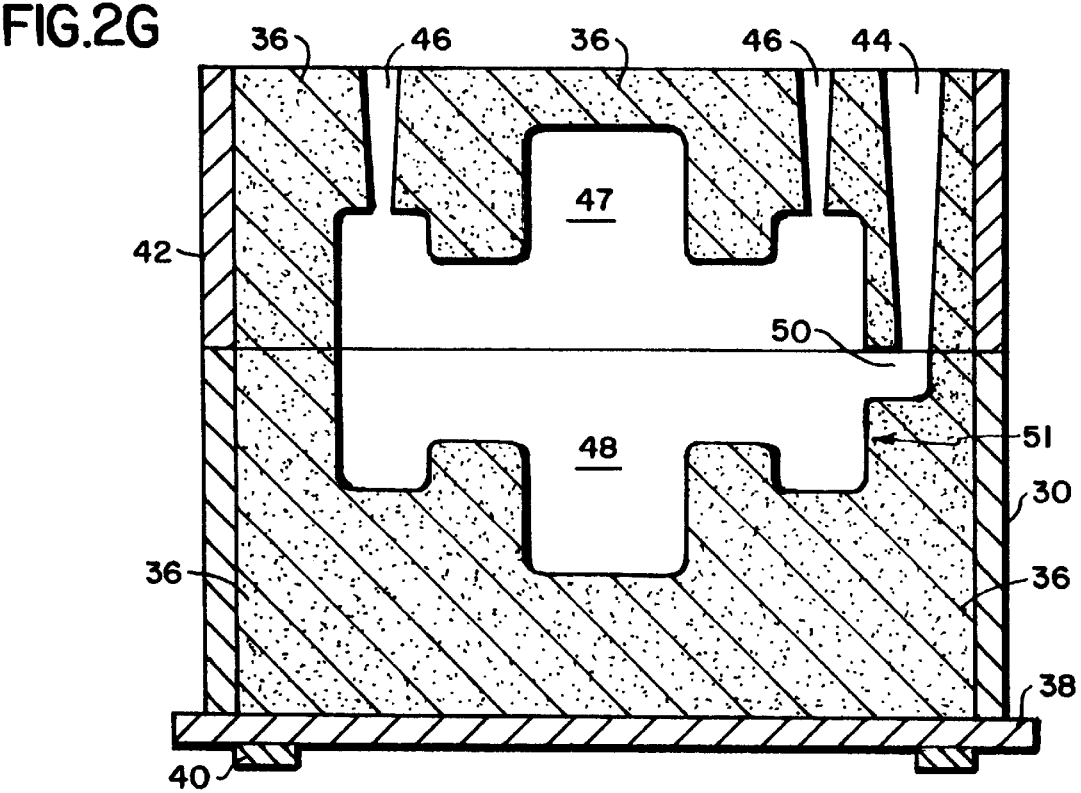
Figure 2H:
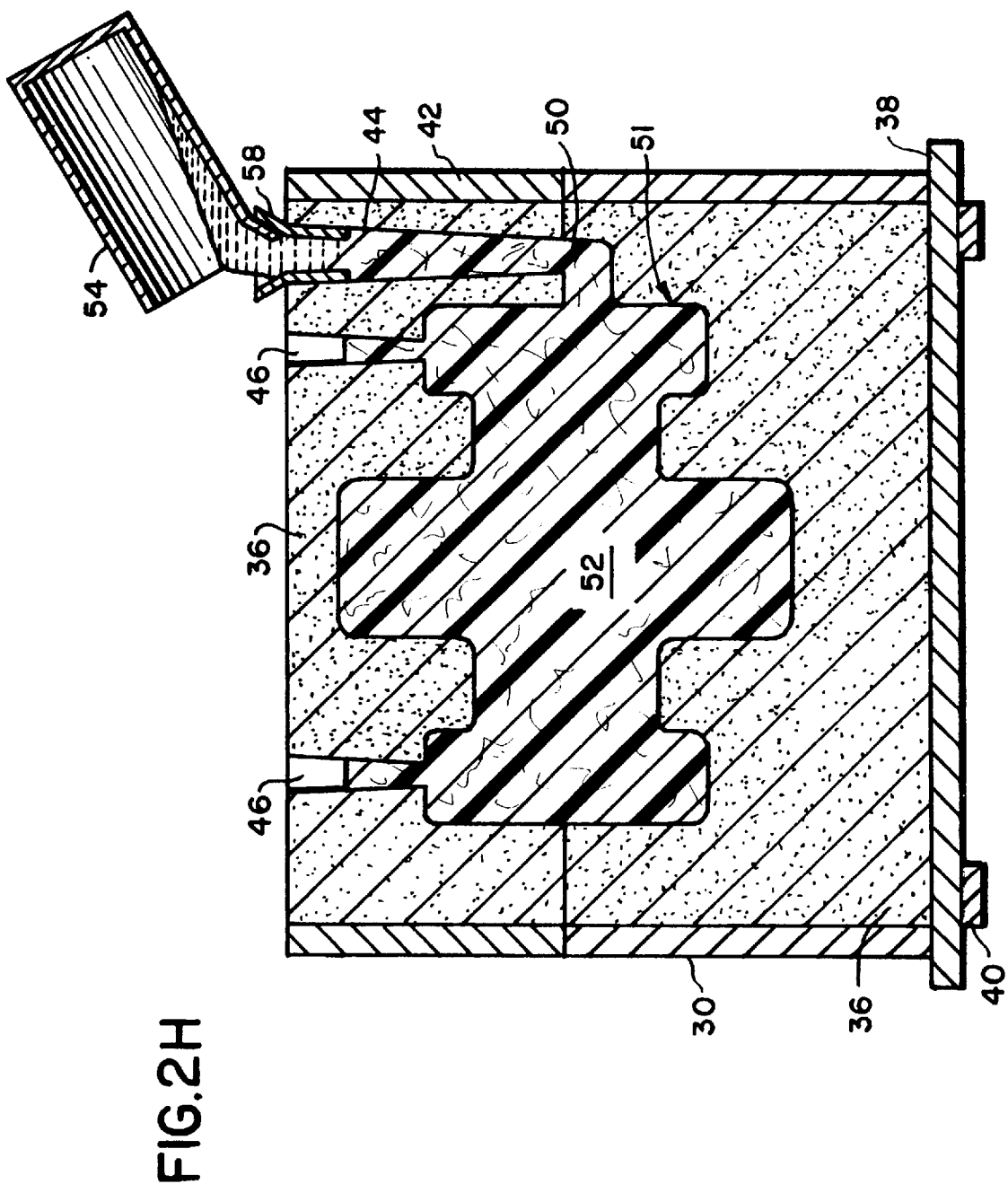

FIG. 2G shows the completely prepared mold just before pouring of the liquid resin. The two empty mold configuration halves 47, 48 are now joined together forming one complete mold configuration 51.

The fiber-resin-catalyst mixture prepared according to the procedures outlined in FIG. 1 can now be poured into the mold, as, for example, by placing the liquid plastic mixture into a beaker 54, then pouring the liquid plastic into the mold making use of a funnel 58 placed in the funnel shaped opening 44 in the top half of the mold. In this manner the liquid plastic mixture fills the mold, is permitted to cure within the mold, and then the sand is broken away, releasing the finished composite, structural plastic object. In typical foundry sand casting the resin binder holding the sand together is burned off, allowing the sand to be shaken out. In the method of the invention, since no heat is involved, a binder that breaks down with water, available from Ashland Chemical Co. and Borden Chemical Co., is employed.

With metal casting, including injection and compression molding, mold release agents must be capable of withstanding high temperatures. Due to the lower temperatures encountered in the method of the invention, although these traditional mold release agents can be employed, simple, low temperature "barrier coatings" can be used. For example, polyethylene film is a suitable agent.

The following is a typical "formulation and procedure" for utilizing the method of the invention:

(A) Resin: Liquid resole phenolic resin, having the following formula

| Phenol formaldehyde polymer | 70–80% |
|---|---|
| Ethylene glycol | 10–12% |
| Phenol | 7–10% |
| Formaldehyde | 1–3% |

(B) Resin viscosity
500 CPS (C) Mix in acid catalyst at room temperature in a 15% by eight ratio. A typical catalyst composition would be

| p-toluenesulfonic acid | 44% |
|---|---|
| Phosphoric acid | 3% |
| Ethylene glycol | 53% |

Mix resin and catalyst together using a standard paddle type mixer (available from the Jiffy Mixer Corp., of Riverside, Calif.).

(D) Add and blend in a milled fiberglass fiber in a volume of 60–65% by weight using the same paddle type mixer.

(E) De-aerate the fiber-resin-catalyst mix by continuing to swirl the mixture in its container. In this example shelf life at room temperature before the mixture becomes too viscous to pour is 10–12 minutes.

(F) Monitor fiber-resin-catalyst mixture temperature. Pour into sand mold at a maximum of +130° F. as mixture starts to gel.

(G) After hardening, remove from sand mold.

(H) Heat treat the composite, structural plastic product at +250° F. for one hour to remove all moisture.

The above mentioned resins and catalysts are available from BP Chemicals, Georgia-Pacific Co., and Ashland Chemical Co. The milled fiberglass is available from Owens-Corning Co., and Fibertec Co.

Thus a new method for utilizing standard foundry sand molds and permanent metal molds is provided by the instant invention. Foundries can now consider this low cost method for replacing traditional metal objects. In addition, the method of the invention produces final composite, structural plastic parts that are actually superior in mechanical and thermal properties to current composite, structural plastic parts produced by traditional and costly compression and injection molds, and does so at significantly lower manufacturing and material costs.

While the present invention has been disclosed in connection with versions shown and described in detail, various modifications and improvements thereon will become readily apparent to those skilled in the art. Accordingly, the spirit and scope of the present invention is to be limited only by the following claims.

What is claimed is:

1. A method for molding composite, structural plastic objects, comprising the steps of:

(a) mixing a liquid thermoset resin with a catalyst and a quantity of reinforcing fibers;

(b) pouring the complete mixture of said resin, said catalyst, and said fibers into a mold, said mold selected from a group of molds used alternatively to cast structural metal objects from molten metal poured therein, said molds characterized at least in that they form a desired structural object in the absence of applied pressure or heat, said mold being selected from the group consisting of sand, permanent, die-cast, wax and investment molds;

(c) allowing said complete mixture to cure into a composite, structural plastic object within said mold; and (d) removing said composite, structural plastic object formed by said curing of said complete mixture within said mold from said mold.

2. The method according to claim 1 wherein said liquid thermoset resin is selected from the group consisting of unsaturated polyester and resole phenolics.

3. The method according to claim 1 wherein said step of mixing a catalyst with said liquid thermoset resin occurs before said step of mixing a quantity of reinforcing fibers with said liquid thermoset resin.

4. The method according to claim 1 further including the step of de-aerating the mixture of said liquid thermoset resin, said catalyst, and said reinforcing fibers prior to said step of pouring said complete mixture into said mold.

5. The method according to claim 4 further including the step of permitting gelation to begin in said complete mixture prior to said step of pouring said complete mixture into said mold.

6. The method according to claim 1 further including the step of post curing said composite, structural plastic object by subjecting said object to a maximum heat of +250° F. for a period of time.

7. The method according to claim 1 further including the step of monitoring the temperature of said complete mixture to insure said temperature of said complete mixture is +130° F. or less prior to said step of pouring said complete mixture into said mold.

8. The method according to claim 1 wherein said reinforcing fibers are fiberglass.

9. The method according to claim 1 wherein the maximum length of said reinforcing fibers does not substantially exceed ¼".

10. The method according to claim 1 wherein said liquid thermoset resin is a resole phenolic.

11. The method according to claim 10 wherein said catalyst is an acid.

* * * * *